United States Patent [19]

Pitts

[11] 4,231,997
[45] Nov. 4, 1980

[54] PREPARATION OF RARE EARTH NITRATES

[75] Inventor: Frank Pitts, Magalas, France

[73] Assignee: Engelhard Minerals & Chemicals Corporation, Menlo Park, N.J.

[21] Appl. No.: 27,530

[22] Filed: Apr. 5, 1979

[51] Int. Cl.$^3$ .............................................. C01F 17/00
[52] U.S. Cl. ..................................... 423/263; 423/395
[58] Field of Search ................................ 423/263, 395

[56] References Cited

U.S. PATENT DOCUMENTS 3,761,571  9/1973  Woodhead ............................ 423/263

FOREIGN PATENT DOCUMENTS 50-9600  1/1975  Japan ........................................ 423/263

OTHER PUBLICATIONS

Schumb et al., "Hydrogen Peroxide", Reinhold Pub. Corp., N.Y. 1955, pp. 375–376.

*Primary Examiner*—Herbert T. Carter
*Attorney, Agent, or Firm*—Inez L. Moselle

[57] ABSTRACT

A process for preparing a rare earth nitrate solution in which rare earth hydroxides containing quadrivalent cerium are dissolved in nitric acid with the addition of hydrogen peroxide. The change in oxidation-reduction E.M.F. may be used to control the addition of peroxide to prevent formation of quadrivalent cerium ions in the nitrate solution.

6 Claims, No Drawings

PREPARATION OF RARE EARTH NITRATES

BACKGROUND OF THE INVENTION

Rare earth nitrate solutions of commerce usually consist principally of the nitrates of lanthanum, cerium, praseodymium and neodymium, sometimes with minor proportions of the nitrates of other rare earth elements. The proportions of the principal rare earth elements present may vary, depending on the method of manufacture and on the rare earth-containing mineral used for their extraction. Most commercial products contain a substantial proportion of cerium, commonly 45% of the total rare earth metals.

Such solutions of rare earth nitrates are generally made by dissolving rare earth hydrates (or hydroxides) in nitric acid. In the manufacture of these hydrates some or all of the cerium becomes oxidized from the trivalent to the quadrivalent state since cerous hydroxide is readily oxidized, even by exposure to the atmosphere, to ceric hydroxide or hydrated ceric oxide. This presents difficulties in preparing nitrate solutions since, although all the rare earths, including cerium in trivalent form, readily dissolve as hydrates in nitric acid to produce solutions of pH above 2 and up to 3.5, when cerium is present in the hydrates in quadrivalent form it will only dissolve in nitric acid if the pH of the solution is maintained below 0.7. A solution of this degree of acidity is undesirable for some applications, such as for making rare earth-modified zeolitic fluid cracking catalysts. Moreover, nitric acid solutions containing quadrivalent cerium are highly corrosive to stainless steel which is one of the most commonly used constructional materials for chemical process plants. It is desirable, therefore, to reduce any quadrivalent cerium to trivalent cerium, which presents no such limitations on solution pH and no abnormal corrosion properties.

Many reducing agents for quadrivalent cerium in acid solution are known. Examples include sucrose, formaldehyde, sulfur dioxide, hyrazine and hydroxylamine. However, all of these have significant disadvantages. Sucrose and formaldehyde react with nitric acid, evolving toxic oxides of nitrogen, and these materials often exhibit a delayed reaction which may be violent. Hydrazine and hydroxylamine both form nitrates which, if dry (as may be the case if the solution is subsequently concentrated by evaporation), may be explosive. Sulfur dioxide produces sulfate ions which are undesirable in rare earth nitrate solutions used for catalyst manufacture.

It is therefore an objective of the present invention to provide a process for the preparation of a rare earth nitrate solution of pH greater than 1 by dissolution in nitric acid of rare earth hydrates containing cerium in quadrivalent form without the objectional features associated with conventional reducing agents. It is another objective of the invention to provide a process control mechanism for the preparation of such solutions.

THE INVENTION

An improved process for preparing rare earth nitrate solutions from rare earth hydrates containing quadrivalent cerium is provided in accordance with the present invention by causing such hydrates to react with aqueous nitric acid in presence of a sufficient quantity of hydrogen peroxide to maintain the oxidation-reduction EMF of the solution below a predetermined value. This value is 900 millivolts, and the preferred lower value is between 600 and 900 millivolts, when the EMF is measured between a platinum electrode and a normal calomel electrode. The oxidation-reduction EMF may be utilized to control, through a transducer, an electromagnetically operated valve through which addition of hydrogen peroxide solution is made.

The reaction products deriving from hydrogen peroxide are water and oxygen and are, therefore, completely non-toxic and innocuous.

DESCRIPTION OF PREFERRED EMBODIMENTS

An aqueous solution of nitric acid is introduced into a vessel provided with a stirrer, pH measuring electrodes and a pair of oxidation-reduction electrodes connected to a milli-voltmeter. The concentration of the nitric acid solution is determined by the concentration of rare earth nitrate solution which it is desired to make. Rare earth hydrates containing quadrivalent cerium are gradually added to the vessel until the final pH of the solution is greater than 1, and preferably lies between 2 and 3.5. During the addition of the hydrates a solution of hydrogen peroxide is added at such a rate that the oxidation-reduction EMF does not exceed 900 millivolts when measured between a platinum electrode and a normal calomel electrode and preferably has a value between 600 and 900 millivolts.

In an especially preferred embodiment of the invention the hydrogen peroxide is introduced through an electro-magnetically operated solenoid valve, the opening and closing of which are activated by the oxidation-reduction EMF via a transducer. Thus, when the EMF approaches 900 millivolts the valve will open and admit hydrogen peroxide until the EMF falls to some lower value, such as 600 millivolts. Since the reaction of hydrogen peroxide with ceric ions is instantaneous, it is possible to avoid the presence of any significant quantity of ceric ions in the solution.

Of course, other oxidation-reduction electrode systems may be used, as is well-known to those skilled in the art, and the preferred EMF range will then be different from that for the platinum-normal calomel electrode. However, the required values are easily determined by routine experiment. In any case, the EMF when ceric ions are present will be substantially higher than when only trivalent rare earth ions are present. The EMF will be further depressed by an excess of hydrogen peroxide.

The concentration of the hydrogen peroxide solution used is not important and any normal commercial product is suitable.

The following examples are given for illustrative purposes and are not considered to be limiting the invention to the specific materials and procedures described therein.

EXAMPLE I

A sample of rare earth hydrates in the form of a moist filter cake was found to contain:

| | |
|---|---|
| Total rare earth as oxides | 53.28% |
| Cerium as $CeO_2$ ($Ce^{+4}$) | 24.90% |
| Cerium as $Ce_2O_3$ ($Ce^{+3}$) | None Found |
| Free and combined water | 40.69% |

One hundred and fifty nine (159) ml. concentrated nitric acid (70% by weight $HNO_3$) and 238 ml. of water were mixed in a beaker provided with a stirrer, pH electrodes and oxidation-reduction electrodes (platinum-normal calomel). While the liquid was being stirred, the rare earth hydrate was gradually added in portions of about 1 gram at a time. It was noted that with each addition of rare earth hydrate the oxidation-reduction EMF increased to about 1300 millivolts. A 20% solution of hydrogen peroxide was added from a burette to reduce the EMF to about 650 millivolts. This procedure was continued until the pH reached 3.0, at which a clear solution of rare earth nitrates in trivalent form was obtained.

The total weight of rare earth hydrate dissolved was 253 grams and the total volume of 20% hydrogen peroxide solution added was 28.8 ml.

EXAMPLE II

This example describes a preferred embodiment of the process of the invention in which the oxidation-reduction EMF is used to control the flow of hydrogen peroxide.

Twelve hundred (1200) lb. of the same rare earth hydrate, such as the one used in Example I, and 500 lb. of water are introduced into a mixing vessel to produce a suspension or slurry of rare earth hydrate. The reaction vessel is provided with a stirrer and cooling coils. The vessel is also provided with pH electrodes connected to a pH meter and oxidation-reduction electrodes (one platinum and one normal calomel electrode). Into the reaction vessel are introduced 1000 lb. of nitric acid (70% by weight $HNO_3$) and 550 lb. of water. A 30% by weight solution of hydrogen peroxide is contained in an elevated storage tank from which it can flow through the electro-magnetic solenoid valve into the reaction vessel. The opening and closing of the solenoid valve are controlled by the EMF of the electrodes via a transducer.

The rare earth hydrate in the mixing vessel is transferred by the metering pump into the reaction vessel with water flowing through the cooling coils of the vessel and at such a rate that the temperature of the reaction mass does not exceed 50° C. The addition of rare earth hydrate is continued until the pH of the reaction mass reaches 2.5. During the addition of rare earth hydrate, hydrogen peroxide is introduced so as to maintain the oxidation-reduction EMF between 650 and 850 millivolts. When the EMF rises to 850 millivolts the solenoid valve automatically opens to allow hydrogen peroxide to flow into the reaction vessel and it remains open until the EMF falls to 650 millivolts whereupon it closes until the EMF rises again to 850 millivolts. Only sufficient rare earth hydrate is transferred to the reaction vessel to raise the pH to 2.5. Any hydrate slurry remaining in the mixing vessel is utilized in subsequent batches.

I claim:

1. In a process for preparing a rare earth nitrate solution from a rare earth hydroxide containing quadrivalent cerium by dissolving said rare earth hydroxide in nitric acid solution in the presence of a reducing agent to prevent formation of quadrivalent cerium ions in the nitrate solution, the improvement which comprises causing said rare earth hydroxide containing quadrivalent cerium to react with said nitric acid in the presence of a solution of hydrogen peroxide as the reducing agent, said solution of hydrogen peroxide and said rare earth hydroxide being incorporated with said nitric acid in a manner such as to maintain the EMF of the solution below 900 millivolts when EMF is measured between a platinum electrode and a normal calomel electrode and to produce a rare earth nitrate solution which contains trivalent cerium ions and has a pH above 1 and not to exceed 3.5.

2. A process in accordance with claim 1 wherein said value is between 600 and 900 millivolts.

3. A process in accordance with claim 1 wherein oxidation-reduction EMF is utilized to control an electro-magnetically operated valve through which the addition of hydrogen peroxide is made.

4. A process in accordance with claim 1 wherein the pH of the rare earth nitrate solution so produced is in the range of 2 to 3.5.

5. A process in accordance with claim 3 wherein the pH of the rare earth nitrate solution so produced is in the range of 2 to 3.5.

6. A process is accordance with claim 1 wherein hydrogen peroxide and rare earth hydroxide are added sequentially to a solution of nitric acid.

* * * * *